United States Patent [19]

Harrison et al.

[11] Patent Number: 5,266,259
[45] Date of Patent: Nov. 30, 1993

[54] MOLDING A REINFORCED PLASTICS COMPONENT

[75] Inventors: Alan R. Harrison, Benfleet, England; Kenneth Kendall, Dearborn, Mich.

[73] Assignee: Ford Motor Company, Dearborn, Mich.

[21] Appl. No.: 947,008

[22] Filed: Sep. 17, 1992

[30] Foreign Application Priority Data

Sep. 17, 1991 [GB] United Kingdom ............ 9119867

[51] Int. Cl.[5] .................... B29C 45/73; B29C 67/14
[52] U.S. Cl. ............................ 264/257; 264/327; 264/328.14; 264/328.15; 264/328.16
[58] Field of Search ........... 264/257, 258, 317, 319, 264/328.14, 328.15, 328.16, 327, 324

[56] References Cited

U.S. PATENT DOCUMENTS

| 3,122,598 | 2/1964 | Berger | 264/328.15 |
|---|---|---|---|
| 3,761,560 | 9/1973 | Newlove | 264/257 |
| 3,843,289 | 10/1974 | Taylor | 425/145 |
| 4,030,953 | 9/1977 | Rutschow et al. | 264/257 |
| 4,201,612 | 5/1980 | Figge et al. | 264/257 |
| 4,385,955 | 5/1983 | Doerfling et al. | 264/257 |
| 4,466,848 | 8/1984 | Ogawa | 264/257 |
| 4,563,149 | 1/1986 | Landis | 425/547 |
| 4,735,758 | 4/1988 | Larsson et al. | 264/257 |
| 4,784,814 | 11/1988 | Diethelm et al. | 264/102 |
| 4,940,563 | 7/1990 | Kromrey | 264/257 |

FOREIGN PATENT DOCUMENTS

| 52-125565 | 10/1977 | Japan . | |
|---|---|---|---|
| 56-53032 | 5/1981 | Japan | 264/257 |
| 57-212022 | 12/1982 | Japan | 264/257 |
| 61-068214 | 12/1984 | Japan . | |
| 60-007136 | 1/1985 | Japan . | |
| 60-73824A | 4/1985 | Japan . | |
| 60-100437 | 4/1985 | Japan . | |
| 61-54633 | 3/1986 | Japan . | |
| 61-175011 | 8/1986 | Japan . | |
| 62-124917 | 6/1987 | Japan . | |
| 62-128721 | 6/1987 | Japan . | |
| 62-134223 | 6/1987 | Japan | 264/257 |
| 63-15707 | 1/1988 | Japan . | |
| 63-255925 | 10/1988 | Japan . | |
| 1-031427 | 2/1989 | Japan . | |
| 1-165132 | 6/1989 | Japan . | |
| 1-238915 | 9/1989 | Japan . | |
| 1-262107 | 10/1989 | Japan . | |
| 584932 | 1/1947 | United Kingdom . | |
| 911647 | 11/1962 | United Kingdom . | |
| 1341213 | 12/1973 | United Kingdom . | |
| 1474148 | 5/1977 | United Kingdom . | |
| 2172542A | 9/1986 | United Kingdom . | |
| 2216841A | 10/1989 | United Kingdom . | |

Primary Examiner—Jay H. Woo
Assistant Examiner—Duane S. Smith
Attorney, Agent, or Firm—Lorraine S. Melotik; Roger L. May

[57] ABSTRACT

In order to mold structural components where a resin is introduced into a mold containing a fibrous preform 24, the mold or tool halves 10, 12 are made as shells and have individually controllable heating circuits 34, 38, 52 around the mold surface. Different parts of the mold can therefore be held at different temperatures in order to ensure adequate resin flow to wet the whole of the preform.

9 Claims, 3 Drawing Sheets

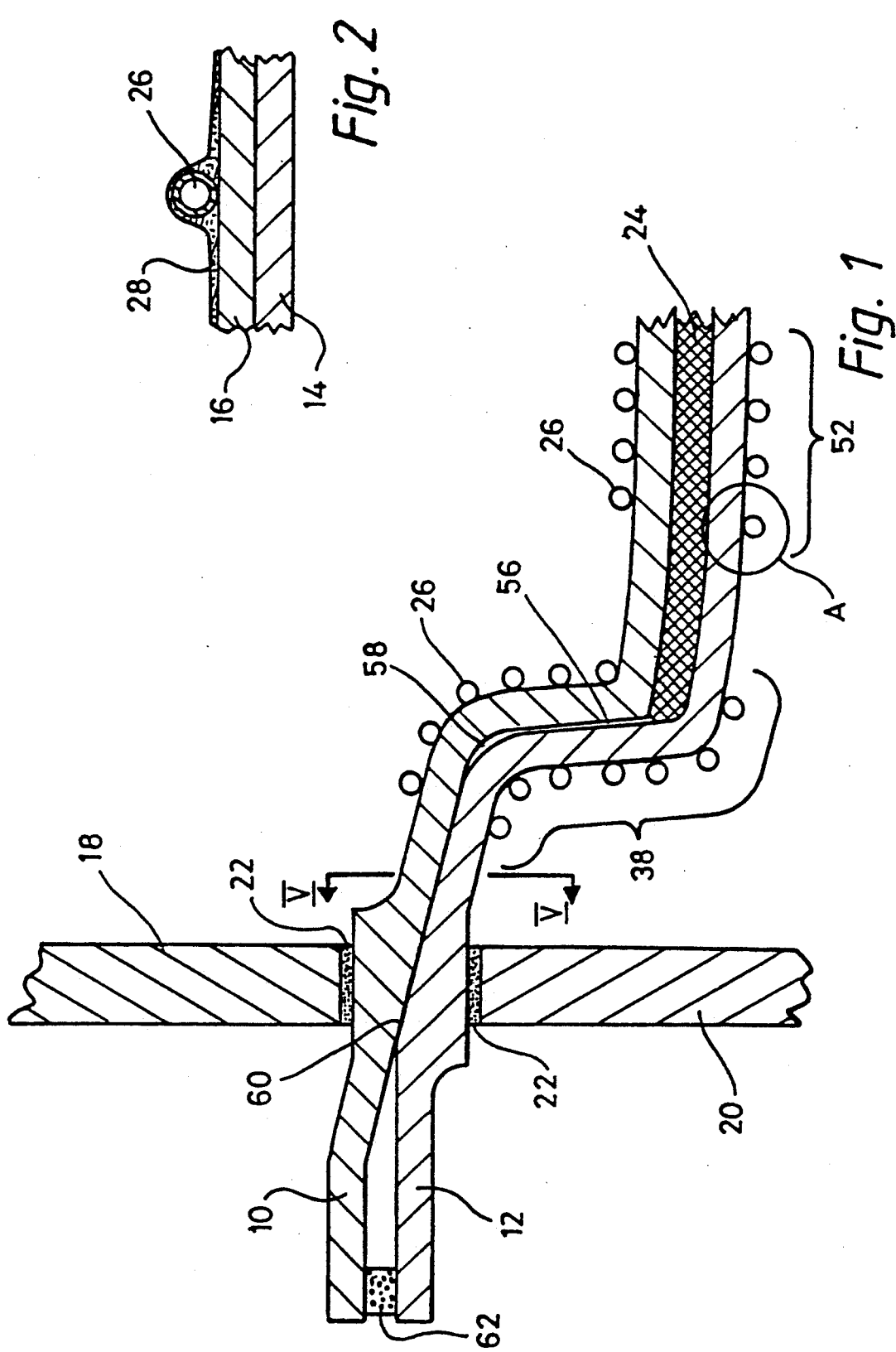

MOLDING A REINFORCED PLASTICS COMPONENT

FIELD OF THE INVENTION

This invention related to a method of molding a reinforced plastics component, and to a tool for molding such a component. The invention is specifically concerned with a method where the reinforcement for the component is made as a preform, and where the preform is placed in the mold cavity before a resin is introduced into the cavity.

BACKGROUND OF THE INVENTION

Preforming the reinforcement allows the strength of the reinforcement to be designed in accordance with the ultimate loading to be experienced by the finished component. That is, the position and direction of the reinforcing fibers can be aligned and Positioned as desired to achieve the desired structural strength of the finished component. The reinforcement can be made from a wide variety of different reinforcing materials, but typically glass fibers and carbon fibers are used.

In the molding of such a component, it is essential that the plastics resin which is introduced to the mold should thoroughly wet the reinforcement. The resin is conventionally introduced through a gate and flows through the preform to an edge of the mold. Air is displaced through the edges of the mold by the advancing resin front.

Various processes are known for molding reinforced plastics components in this way. The majority of such components fall under the category referred to as resin transfer molding (RTM) where a polymerized resin is introduced into the mold.

Such known molding methods however have a number of disadvantages. In order to ensure thorough wetting of the preform, particularly around the edges of the mold, many known processes require a slow cure time so that the resin remains liquid and can flow over a long period. Long cycle times however are disadvantageous for volume production.

Other methods use an excess volume of resin so that resin bleeds out of the mold around the edges, thus ensuring that the reinforcement at the edges of the mold is fully wetted, but requiring subsequent trimming of considerable flash and resultant wastage.

SUMMARY OF THE INVENTION

According to present invention, there is provided a method of molding a reinforced plastics component, the method comprising the steps of placing a reinforcement Preform in the mold cavity of a shell tool, introducing a plastics resin to the mold cavity through a gate and maintaining the gate and the edge of the mold at temperatures above the temperature of the body of the mold, so that the resin is able to flow freely at the edges of the mold to wet the preform.

The invention also provides a shell tool for molding a reinforced plastics component, the tool having an inner surface defining a mold cavity and an outer surface exposed to ambient conditions, the outer surface being provided with a plurality of independent heating circuits operating to maintain different parts of the tool at different temperatures. The invention further provides for the use of such a shell tool for resin transfer molding.

The combination of a shell tool (which has a low thermal mass) with individual heating circuits for different parts of the tool, allows close local temperature control of the tool to optimize the flow patterns of the resin.

Preferably the tool comprises two tool halves which meet around an edge region. The edge region preferably is arranged to leave a passage through which air can be expelled from the mold cavity, the passage being in the form of a narrow gap between the surfaces of the tool halves themselves. The tool, in the edge region, is preferably provided with heating means so that the temperature of the tool in the edge region can be raised.

Working outwards from the tool cavity, the passage between the tool halves may include a very narrow gap through which air can flow and through which resin can just flow, followed by an expansion space, followed by a controlled mating face through which air can flow but through which resin cannot flow.

The tool halves are preferably mounted in cast aluminum frames which allow the tool halves to be opened and closed.

BRIEF DESCRIPTION OF THE DRAWINGS

FIG. 1 is a cross sectional view through part of a shell tool in accordance with an embodiment of the invention.

FIG. 2 is a detail of the tool wall construction, taken in the area indicated by the circle A in FIG. 1.

DESCRIPTION OF PREFERRED EMBODIMENTS

Figure 3:
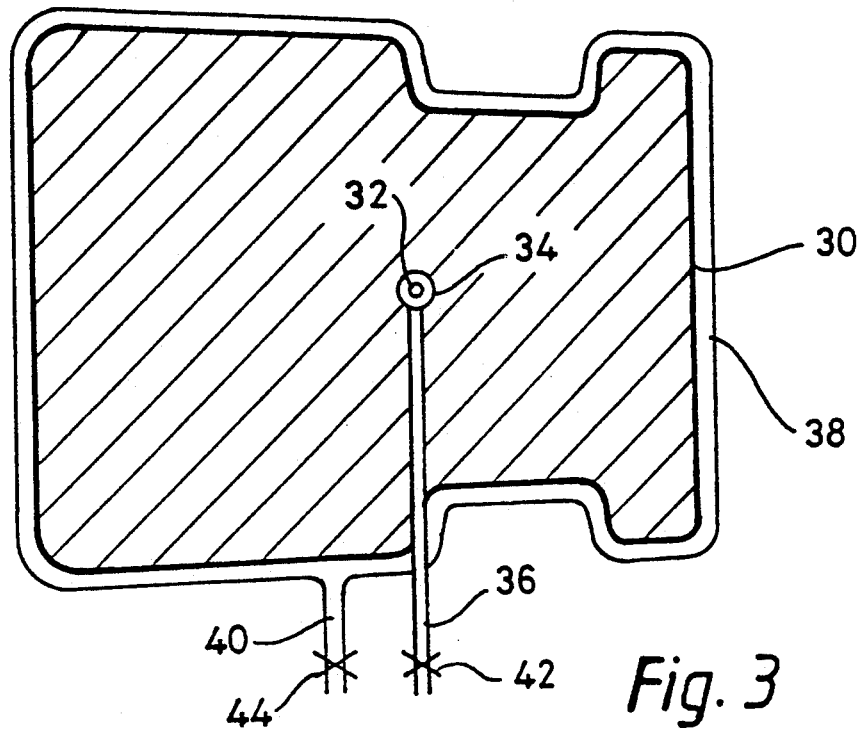
FIG. 3 is a plan view of a tool in accordance with the invention showing gate and edge heating circuits.

The shell tool embodiment shown in FIG. 1 consists of an upper tool half 10 or mold punch 10 and a lower tool half 12 or mold die 12. The tool halves are made by electroforming onto a pattern manufactured in accordance with the desired component shape. As can be seen in FIG. 2, the walls of the mold halves 10, 12 are made up of an inner skin 14 of nickel which is plated directly onto the pattern to a thickness of about 3mm, and an outer skin 16 of copper plated directly onto the nickel and also having a thickness of about 3mm making a total wall thickness of about 6mm for the shell tool walls.

Shell tools are in themselves known. As will be apparent from the above description, they are relatively thin walled, and of a generally constant wall thickness over the whole tool surface. The use of nickel for the inner surface of the wall gives a good surface finish and a high level of hardness. Backing the nickel layer with a copper layer gives additional toughness. Also the copper layer is cheaper to lay down and plates out more quickly than the nickel layer. It is also easier to bond additional components to the copper surface than it would be to a nickel surface.

In conventional shell tooling technology, the electrodeposition process is used to define the inner surface of the tool. However, the outer surface of the tool is usually backed up with a substantial body of material which is either intended to or has the effect of increasing the thermal mass of the tool. As a result, it is difficult to arrange for the tool to be at different temperatures at different points on the tool surface. However, in the present invention, a low thermal mass is desirable so that different parts of the mold surface can be maintained at different temperatures, and there is no backing to the tool walls.

The tool halves 10 and 12 are supported in cast aluminum frames 18, 20, only parts of which are shown in FIG. 1.

In order to obtain adequate support of the mold surfaces, to maintain seal integrity and to control the part thickness, additional copper is deposited in the regions 23, and these regions are machined flat prior to assembly with the support frames 18, 20. The adjacent surfaces of the support frames are also machined in this region. The interface between the frames and the mold parts is required to transmit compressive loads, to allow thermal movement and to prevent support frame witness marking, while providing a means of reacting shell breakaway forces in the event of component adhesion. As shown in FIG. 1, this is accomplished by Providing a nominal 5mm clearance between the tool halves 10, 12 and the support frames 18, 20, respectively, and filling these clearances with an epoxy resin 22 which is bonded to the support frames but not to the shell. Thus, the joint cannot support tension or shear but can transmit compressive loads, allowing differential expansion between the shell and frame to occur unrestrained. The use of an epoxy resin filler also insulates the frame from the shell and prevents witness marking. A number of studs are electroformed into the rear face of the shell to provide fixture points. These studs are passed through holes drilled through bosses cast into the support frame, providing a number of fastening points to react shell breakaway forces. The support frame also includes mold guidance dowel pins, mold fixture holes and a set of handling/transportation clamps.

In use, before the tool halves 10, 12 are placed together, a fiber reinforcement preform 24 is placed in the mold cavity. This preform will occupy substantially the whole of the mold cavity, extending up to the edges and to the opposite faces of the cavity and leaving just the interstices between the fibers to be filled with resin.

The external surfaces of the mold halves 10 and 12 are in contact with ambient conditions, and the temperature at a particular place within the mold cavity is influenced by a number of heating circuits which appear on the surface of the mold halves in the form of pipes 26. Those in the art will appreciate that other heating means could be similarly employed. As can be seen in FIG. 2, the pipes 26 can be attached to the outer surface of the tool by a bandage 28, for example in the form of a strip of resin-impregnated glass fiber. A small thickness of glass fiber such as the bandage 28, of low thermal mass, will not prevent the outer surface of the tool from being regarded as "exposed to ambient conditions".

The preform 24 can be produced from any suitable reinforcing fiber. Carbon fibers or glass fibers are particularly suitable.

Figure 4:
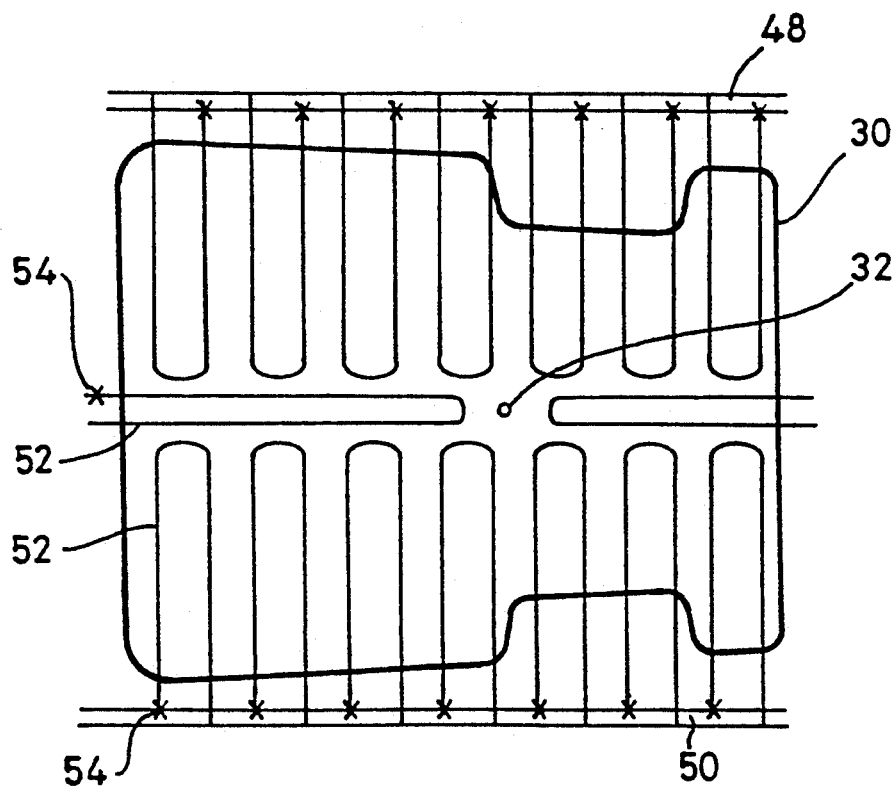
FIG. 4 is a plan view corresponding to FIG. 3 but showing heating circuits for the body of the tool.
Figure 5:
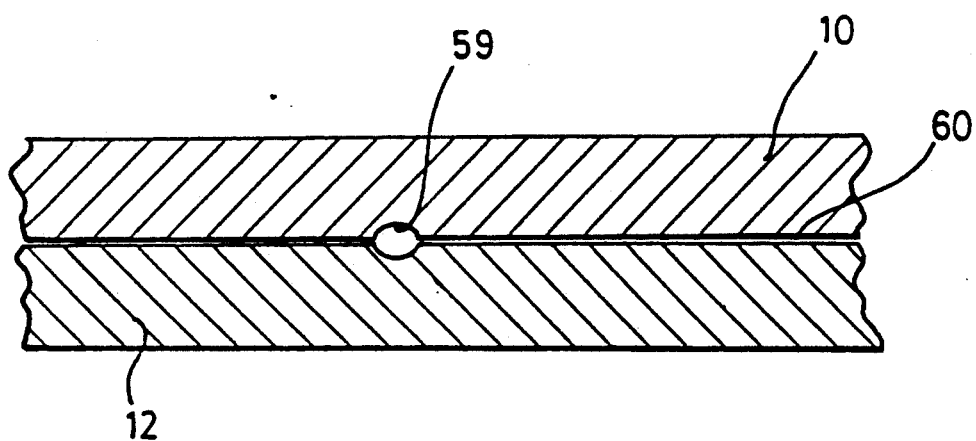
FIG. 5 shows a section through the tool wall construction of FIG. 2, on the line V—V.

In order to control the local temperature within the mold, a number of separate heating circuits are provided as shown in FIGS. 3 and 4. These Figures are plan views of a mold for a car body undershield. The outline of the mold itself is shown at 30 with heavy lines. A pin gate 32 is provided near the middle of the mold for the introduction of resin into the mold cavity. A first heating circuit 34 is provided around the gate and is fed with a heating medium through a pipe 36. A second heating circuit 38 is provided around the edge of the mold 30, to heat the flash gap 56, and is fed with heating medium through a pipe 40. The circuits 34 and 38 thus control temperatures of respectively the gate and the edge region. Flow through the pipes 36 and 40 is controlled by independent valves 42, 44.

FIG. 4 shows a multiplicity of separately controllable heating circuits for the main body of the tool. These circuits are fed from manifolds 48, 50 and each comprise a U-shaped pipe 52 extending over part of the surface of the tool. Each pipe is controlled by an inlet valve 54 which can be regulated in accordance with the desired temperature at which that part of the tool is to be maintained.

Generally the temperatures in the manifolds 48, 50 will be lower than the temperatures in the circuits 34, 38.

Returning now to FIG. 1, the edge region of the tool has a flash gap 56 where the tool halves nearly close but leave a small gap between them. The flash gap is vertical to aid mold cleaning by the self-cleaning action of the component itself upon demolding. Flash present at the end of the molding cycle will be removed along with the component, minimizing mold cleaning time. The vertical flash gap can also be worked during the final assembly of the mold to provide a restriction to resin flow while minimizing the volume of resin to be cured. The thin flash on the molded component can easily be removed by a shearing or similar operation. A large radius around the periphery of the mold die is used t pinch the preform between the punch and the die. This peripheral pinch-off would cause local deformation of the preform, permitting the preform to be toleranced slightly undersize while preventing preferential flow by filling the peripheral gap. The vertical flash gap also aids Preform placement by guiding the preform into the cavity in the die.

When the resin flows into this flash gap 56, it will do so in a very thin layer. At the same time, the heating circuit 38 will ensure that this thin layer is heated to a relatively high; temperature so that a rapid cure will take place resulting in a solidification of the resin in this gap 56.

If resin flows through the gap 56 before setting occurs, then the excess resin will build up in expansion gap 58 where the space between the two tool halves is slightly larger than in the gap 56.

Beyond the expansion gap 58 is a region 60 where the tool halves 10, 12 are in metal to metal contact with one another. Air vents 59 are however provided through the metal to metal seal. An outer, backup seal 62 is also provided between the tool halves just in case there should be an escape of resin. Should it become desirable to control the cavity pressure subsequent to impregnation, a controllable air vent valve (not shown) can be fitted into the peripheral gallery formed between the metal to metal seal and the backup seal 62.

In use, the preform 24 is placed in the mold cavity and the tool halves 10, 12 are closed. Resin is introduced into the mold through the gate 32 and flows radially outwardly in all directions towards the edge region. The resin is initially heated in the gate, to reduce its viscosity and to initiate the curing reaction. As resin flow continues, the hot resin from the gate will encourage flow through the preform 24, and this will be assisted by the heat applied to the rest of mold by the heating circuits 52

However as the resin reaches the edge of the mold, some extra help is needed to ensure that the resin thoroughly wets out the edges of the preform 24, and this is supplied by the heating circuit 38 which once again raises the temperature of the tool and lowers the viscosity so that both the edges of the preform are wetted out and the resin runs into the gap 56 to form a seal at the edges of the mold.

Because of the construction of the mold edges with a narrow gap, an expansion space and a controlled mating face, no separate mold seal is required. This is a particular advantage on demolding, because the mold will be very easy to clean, and any flash will be very easy to remove. The mold cavity can usually be cleared before being prepared for the next cycle, simply by blowing any debris from around the edges away with an airline.

For example, if the resin used has a curing temperature of 80° C., then the gate temperature maintained by the circuit 34 could be 120° C., the edge region temperature maintained by the circuit 38 would be 120° C. and the rest of the mold would be maintained at 80° C. This scheme however will need modification and customizing to each different shaped mold and different shaped component, to ensure complete wetting of the preform while keeping the cycle time as short as possible.

We claim:

1. A method of molding a reinforced plastics component, the method comprising the steps of placing a fibrous reinforcement preform in the mold cavity of a shell tool, introducing a liquid plastics resin to the mold cavity through a gate and maintaining the gate and the edge of the mold at temperatures above the temperature of the body of the mold, so that the resin is able to flow freely at the edges of the mold to wet the preform.

2. The method according to claim 1, wherein said placing step comprises providing a shell tool which comprises two tool halves which meet around an edge region, said edge region being arranged to leave a passage through which air can be dispelled from said mold cavity, said passage being in the form of a narrow gap between the surfaces of the tool halves themselves.

3. The method according to claim 2, wherein said maintaining step comprises providing said edge region with heating means so that the temperature of said tool in said edge region can be raised.

4. The method according to claim 2, wherein said placing step comprises providing in the passage between said tool halves, in the edge region and working outwards from said mold cavity, a very narrow gap through which air can flow and through which resin can just flow, followed by an expansion space, followed by a controlled mating face through which air can flow but through which resin cannot flow.

5. The method according to claim 3, wherein said placing step comprises providing in the passage between said tool halves, in the edge region and working outwards from said mold cavity, a very narrow gap through which air can flow and through which resin can just flow, followed by an expansion space, followed by a controlled mating face through which air can flow but through which resin cannot flow.

6. The method according to claim 2, wherein said placing step comprises providing tool halves mounted in case aluminum frames.

7. The method according to claim 3, wherein said placing step comprises providing tool halves mounted in case aluminum frames.

8. The method according to claim 4, wherein said placing step comprises providing tool halves mounted in case aluminum frames.

9. The method according to claim 5, wherein said placing step comprises providing tool halves mounted in case aluminum frames.

* * * * *